United States Patent [19]
Jen-Hu

[11] Patent Number: 5,450,674
[45] Date of Patent: Sep. 19, 1995

[54] MULTIPOTENT ASTROLABE

[76] Inventor: Wang Jen-Hu, Ste. 1, 11F. No. 95-8 Chang Ping Rd. Sec. 1, Taichung, Taiwan

[21] Appl. No.: 258,513

[22] Filed: Jun. 13, 1994

[51] Int. Cl.⁶ .................. G01C 17/34; G01C 21/02
[52] U.S. Cl. .................. 33/268; 33/15 C; 434/289
[58] Field of Search ............ 33/268, 269, 15 C, 431; 434/289, 284, 287, 288; 325/61 D, 400, 404

[56] References Cited

U.S. PATENT DOCUMENTS

| | | | |
|---|---|---|---|
| 531,060 | 12/1894 | Ormsby | 434/284 |
| 832,527 | 10/1906 | Barritt | 434/289 |
| 1,401,446 | 12/1921 | Rude | 434/289 |
| 2,304,797 | 12/1942 | Collins | 434/289 |
| 2,397,002 | 3/1946 | Hagner | 434/289 |
| 2,432,958 | 12/1947 | Wenzel | 33/269 |
| 3,003,258 | 10/1961 | Stefano | 434/289 |

FOREIGN PATENT DOCUMENTS 882320 7/1953 Germany ............... 434/289

*Primary Examiner*—Christopher W. Fulton

[57] ABSTRACT

A multipotent astrolabe is used to determine the positions of various celestial bodies by applying the circular star atlas and taking into account ephemeral time and the porjections of the relative positions of the moon, the sun and the stars as viewed from the earth. In addition, the positions of the planets of the solar system are included in the multipotent astrolabe to increase the utility of this instrument in the domain of skywatching.

4 Claims, 11 Drawing Sheets

J = Jupiter
Me = Mercury
Mo = Moon

FIG. 1

J = Jupiter
Me = Mercury
Mo = Moon

FIF. 4

Dec = Decmber
Nov = November

MULTIPOTENT ASTROLABE

BACKGROUND OF THE INVENTION

The present invention relates to a multipotent astrolabe or an instrument for observing stars, more particularly to a multipotent astrolabe which is to improve a rotary star dial and used to determine the positions of various celestial bodies by applying the circular star atlas and taking into account ephemeral time and the projections of the relative positions of the moon, the sun and the stars as viewed from the earth. In addition, the positions of the planets of the solar system are included in the multipotent astrolabe to increase the utility of this instrument in the domain of skywatching.

Our ancestors, for facilitating the investigation and location of the celestial phenomena, developed a lot of instruments such as a chart, a list, a disk or a spherical device to determine the relative positions of celestial bodies thereon. Through practical operations and experiments during the past years, they proved that these instruments were adaptable for the simulation or assistance of the astronomical observation.

A series improvements have been made progressively thereafter. These instruments have been embodied a celestial sphere, an armillary sphere or a rotary star dial as we have seen nowadays.

Among the achievements of our ancestors, I find out that the simple and partable rotary star dial is worth the effort to further improvements incorporation with additional functions in order that a rotatable disk shaped instrument can be worked out instead of the above armillary sphere to perfectly manifest the relationship among astronomy, geography, calendar and time. That's the reason why a multipotent astrolabe has been disclosed.

SUMMARY OF THE PRESENT INVENTION

The present invention of a multipotent astrolabe provides a complete but simple, portable, and low-cost instrument for starwatching. By applying the circular star atlas and taking into account ephemeral time and the projections of the relative positions of the moon, the sun and the stars as viewed from the earth, the multipotent astrolabe is used to determine the positions of various celestial bodies. In addition, the positions of the planets of the solar system are included in the multipotent astrolabe to increase the utility of this instrument in the domain of skywatching.

The principle of this instrument is based on categorizing the celestial bodies. The celestial bodies can be divided into three categories.

The first category covers the numerous extrasolar stars which are very far away and thus their positions in the celestial sphere do not appear to change at all during our lifetime. It is easy to determine the positions of the stars in the first category.

The second category covers the sun and the moon. These celestial bodies have great profound effects on the earth, such as in the earth's ecology, energy resources, day and night alternation, seasonal changes and tides. Traditional calendars and calendars of ancient cevilization are all based on the relative movements of these two celestial bodies. Hence, it is not difficult to determine their positions either.

The third category of the celestial bodies are the other planets and satellites in the solar system besides the sun and the moon. Their effects on the earth are not as great as those of the sun and the moon but they are the most interesting objects in modern space explorations. Since these planets and satellites of the solar system are relatively close to the earth, their movements result in great changes of positions relative to the earth. There is no simple way commonly used for determining their positions. Therefore, it is more difficult to determine the positions of these celestial bodies of the third category than the other categories.

Fortunately, the orbital planes of these planets in the solar system except that of Pluto are rather close to the ecliptic plane. (The orbit of Pluto is 17.13 degrees inclined to the ecliptic.) The phase angles between these planetary orbits and the sun change periodically. Thus, it is quite feasible to determine the positions of the planets by using actual models.

For example, the orbital period of Pluto is 247.69 years and the planet only travels 1.47 inches on the surface of the celestial sphere. Uranus and Neptune do not seem to move a great distance on the celestial sphere either, even though the orbital period of Uranus is 84.013 years and that of Neptune is 164.79 years.

Therefore, it is appropriate and convenient to indicate the positions of the planets along their orbits with respect to years. However, for Venus, Jupiter, mercury, Mars and Saturn, the orbital radius and revolution period are relatively small, the distance of the planetary movement on the celestial sphere becomes noticeable even within a few days.

The planets of the solar system are divided into two groups: the inferior planets (Mercury and Venus) which lie closer to the sun than earth and the superior planets (Mars, Jupiter, Saturn, Uranus, Neptune and Pluto) which orbit the sun at distances greater than that of Earth.

Figure 1:
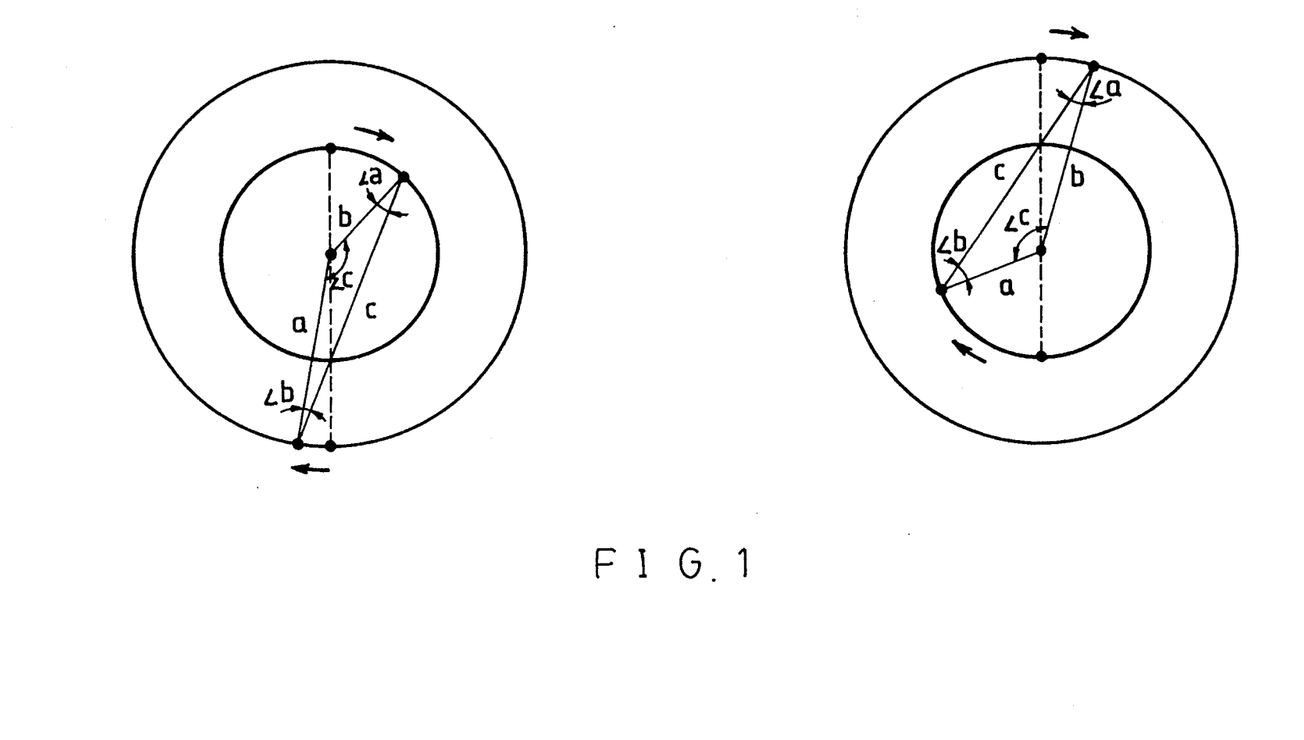
FIG. 1 shows the relationship of the orbits between the interior planets, the superior planets and the Earth.

Disregarding eccentricity and orbital inclination, the relationship between the orbit of Earth around the sun and the inner and outer planets is shown in FIG. 1, wherein, a and b respectively are the semimajor axis of the orbit of another planet and Earth.

Let T be the orbital period of the planet and N be the number of days.

When an inferior planet is at superior conjunction (that is when it is aligned with the sun or at the same ecliptics longtitude as the sun and behind it), the phase angle a (that is the angle between the two lines formed by joining the centre of the inferior planet to the sun and to the earth) becomes zero degree.

After N days from the time of superior conjunction, as shown in the left diagram of FIG. 1.

$$\text{Angle } c = \pi - 2\pi/T \times N + 2\pi/365.25 \times N$$

From the cosin theorem, $$c = (a^2 + b^2 - 2ab\cos{<}c)^{\frac{1}{2}}$$

From the sine theorem, $\sin\angle c/c = \sin\angle b/b$
thus, the alternate angle b observed from Earth between the inferior planet and the sun becomes $$<b = \sin^{-1}\left(\frac{b}{c}\sin{<}c\right)$$

When a superior planet is at superior conjunction, the phase angle is Zero. After N days, as shown in the right diagram of FIG. 1, $$Angle\ c = \pi + 2\pi/T \times N - 2\pi/365.25 \times N$$

From the cosine theorem, $$c = (a^2 + b^2 - 2ab\cos\angle c)^{\frac{1}{2}}$$

From the sine theorem, $\sin\angle c/c = \sin\angle b/b$
thus, the alternate angle b observed from earth between the inferior planet and the sun becomes $$\angle b = \sin^{-1}\left(\frac{b}{c}\sin\angle c\right)$$

From these equations, when N is known, the alternate angle between the planet and the sun on the ecliptic can be determined. Further, the position of the planet can be worked out if the position of the sun is known.

Similarly, on the first day of a month in the luner calendar, the phase angle between the line joining the earth to the moon and the line joining the earth to the sun is zero. The phase angle can be determined from the date in the calendar. Thus, the positions of the moon can be worked out if the position of the sun is known.

The phase angle is subject to periodic change according to the orbital period of the celestial body. For the moon, the orbital period is 29.5 days. For Mercury, 116 days; Venus, 577 days; Mars, 780 days; Jupiter, 399 days; Saturn, 378 days. Thus, a calendar can be developed based on the conjunctive period of each celestial body, such as the luner calendar, Venus calendar, Jupiter calendar, etc. Although historically there is no known planetary calendar, it is reasonable and feasible to determine the positions of a planet based on the solar calendar and the date of conjunction (or the date of opposition).

The coordinates of the celestial sphere follow the curvature of the sphere but can be planarized into the coordinates of the star atlas. In fact, the coordinates (longitude and latitude) of the earth are interrelated with the coordinates (right ascension and declination) of the celestial sphere. The terrestrial equator is extended to the celestial equator; the terrestrial North and South Poles are extended to the celestial north and south poles. When it is possible to planarize the coordinates of the earth into a geographic map, it is of course possible to planarize the coordinates of the celestial sphere into a celestial atlas. Such a planarized celestial atlas can be combined with the geographic map because the celestial coordinates are extensions of the terrestrial coordinates. A version of this celestial atlas is a planarized celestial sphere with the projection of the terrestrial coordiantes to facilitate the determination of the position of the celestial bodies with references to the relative movements of the earth and the celestial bodies.

DETAIL DESCRIPTION OF THE PREFERRED EMBODIMENT OF THE PRESENT INVENTION

Figure 2:
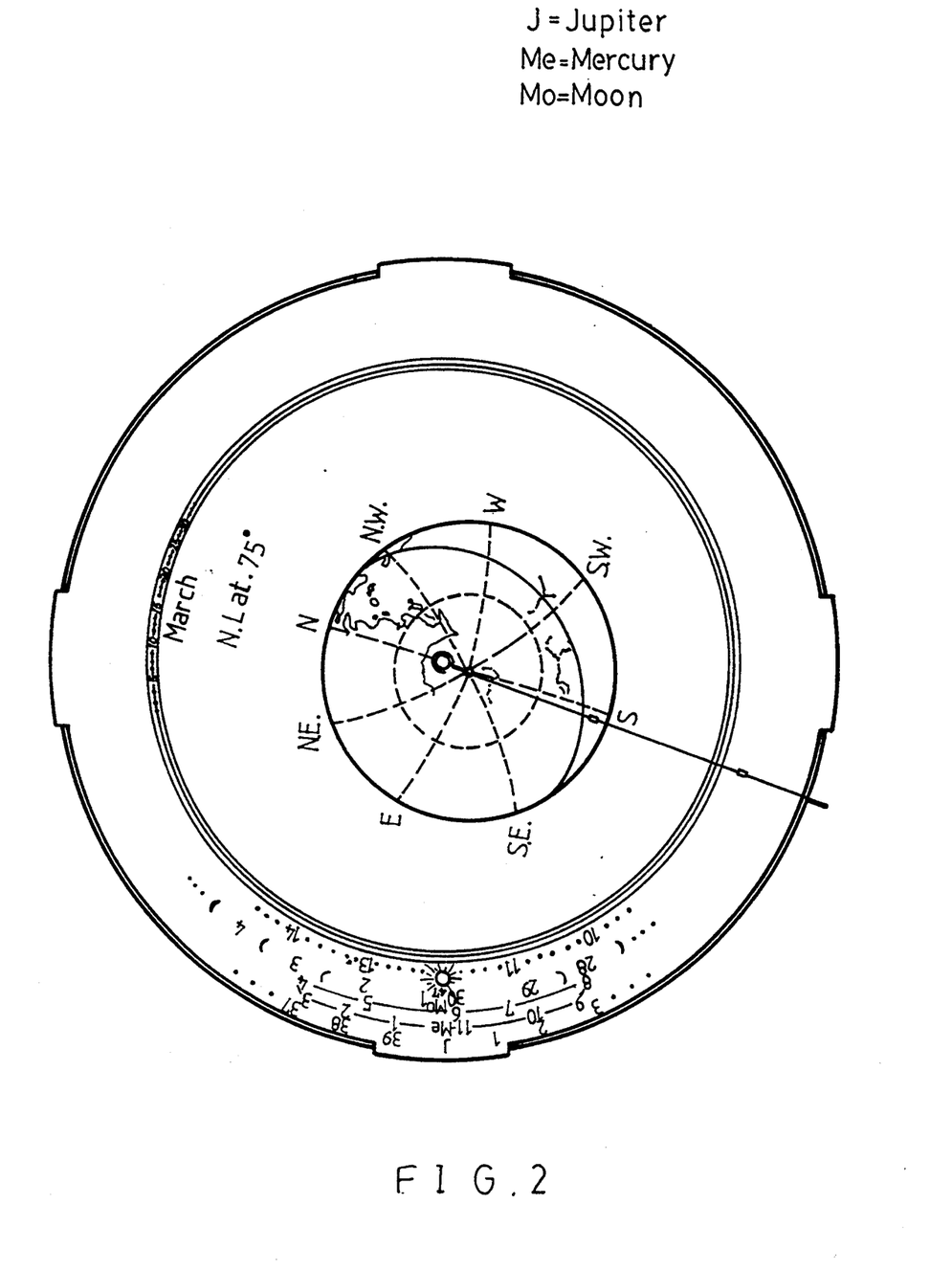
FIG. 2 shows the northern view of a multipotent astrolate.
Figure 3:
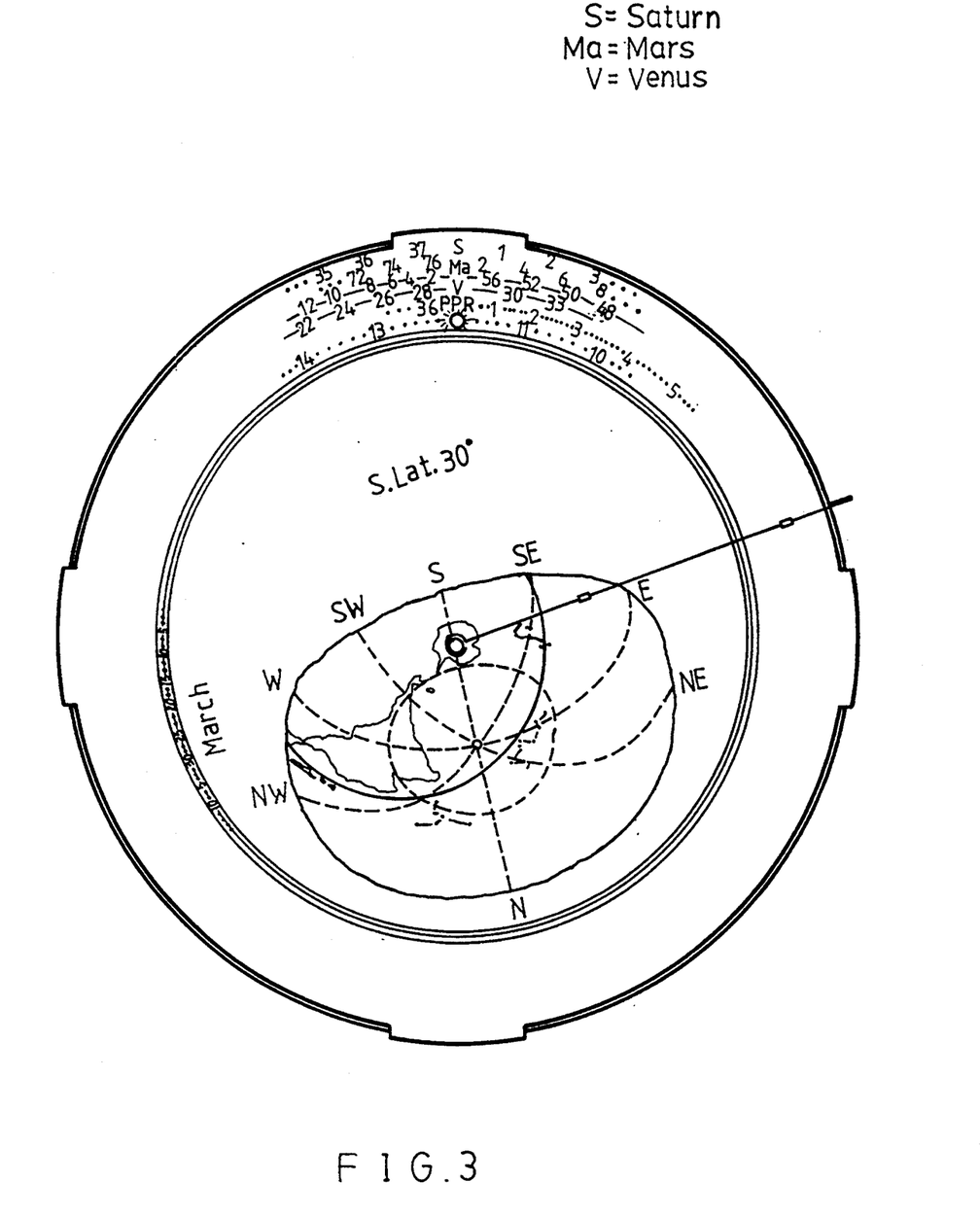
FIG. 3 shows the southern view of a multipotent astrolate.

The northern and southern view as of a multipotent astrolabe are shown by FIGS. 2 and 3 respectively. Except the longitudinal retrograde wire 48, sliding indicator 50, and polar axis 54, the views are concentric, planar, symmetrically connected and revolving around the polar axis for determinations with multiple variables.

Figure 4:
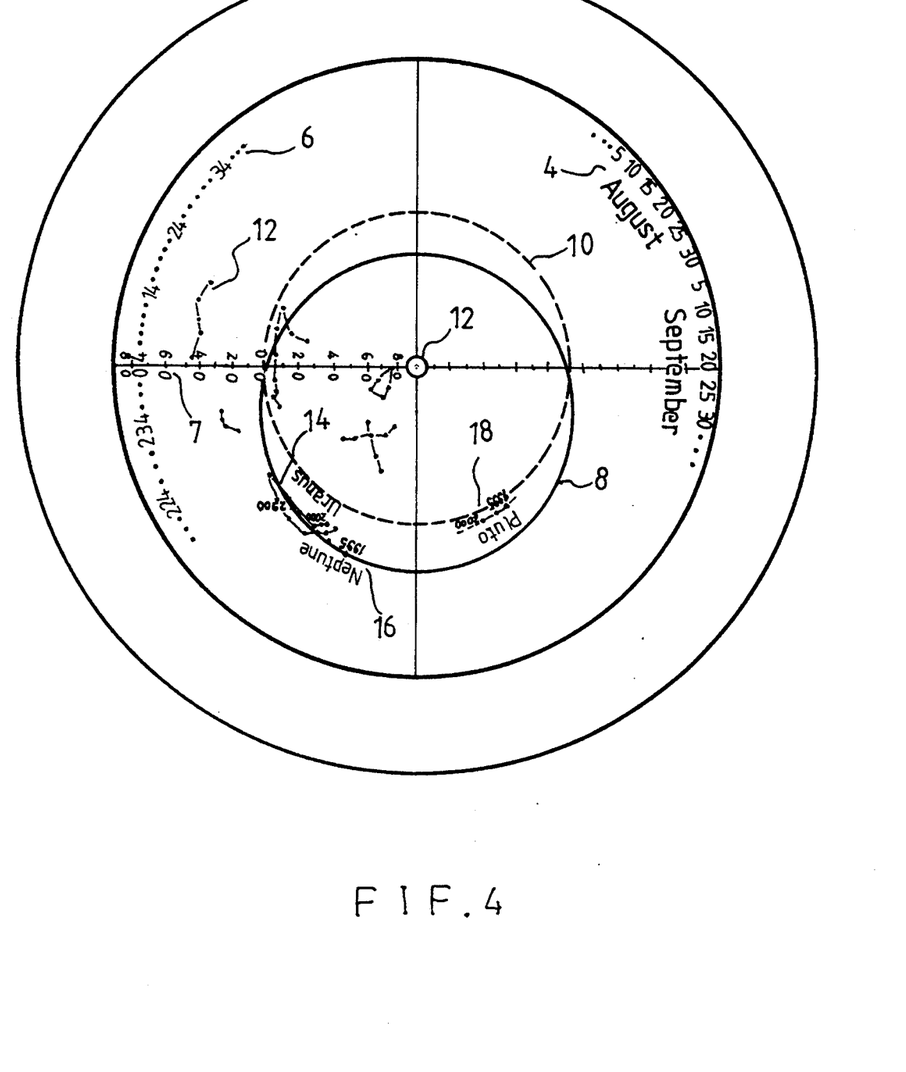
FIG. 4 shows the northern view of a star atlas.
Figure 5:
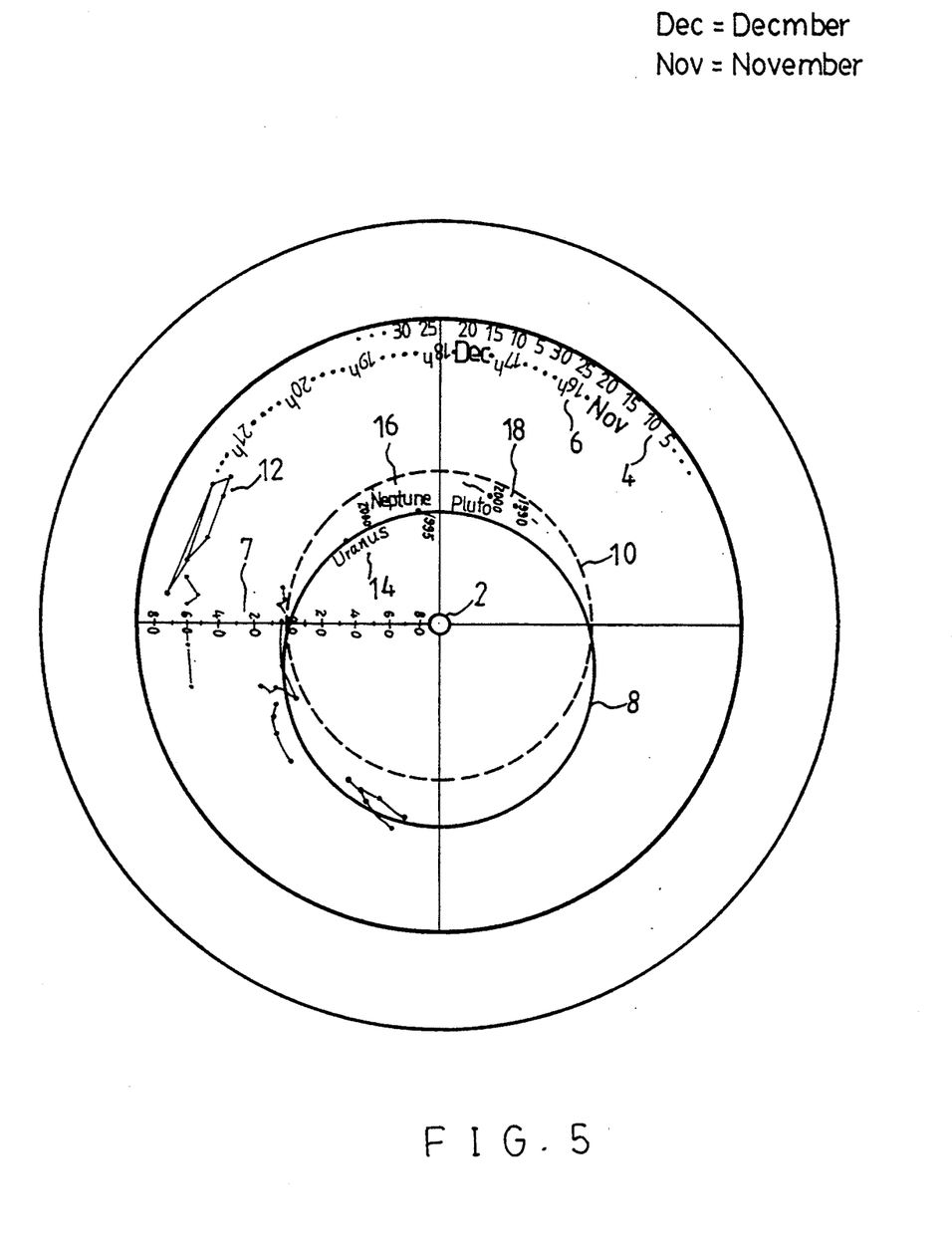
FIG. 5 shows the southern view of a star atlas.

The star atlas (FIGS. 4 and 5) centers at the polar hole 2 of the north celestial pole and south celestial pole. Based on ecliptic longitude and ecliptic latitude, the positions of the stars and constellations 12, the ecliptic 8, the celestial equator 10 and the orbits of Uranus 14, Neptune 16, and Pluto 18 can be located.

Figure 6:
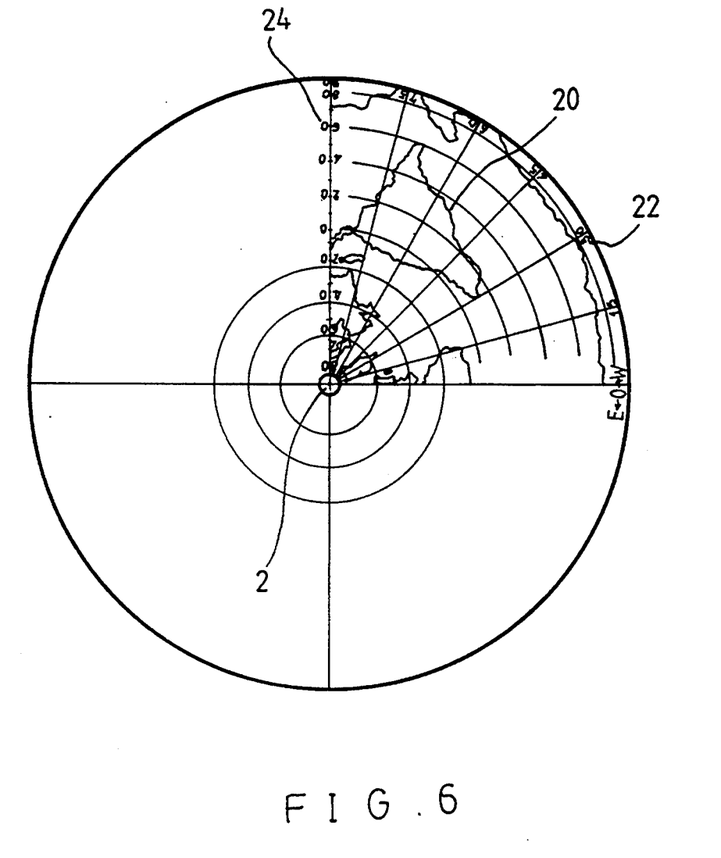
FIG. 6 shows the northern view of a terrestrial map.
Figure 7:
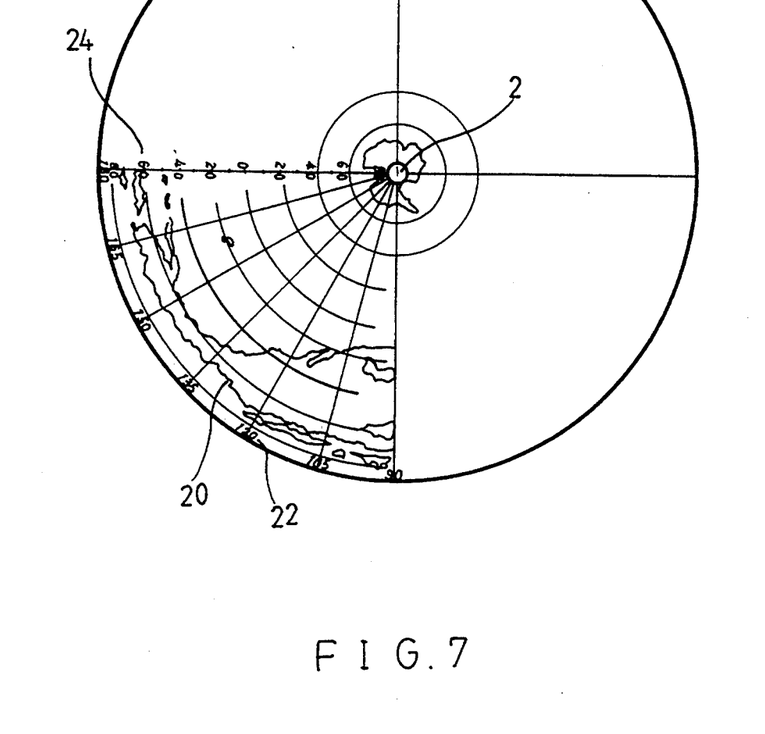
FIG. 7 shows the southern view of a terrestrial map.

The terrestrial maps (FIGS. 6 and 7), lade of transparent plastic boards, also centers at the polar hole 2. With a complete set of longitudinal 22 and latitudinal 24 lines, the boundaries of land masses and waters can be marked.

The indications of the northern and southern faces of the planetary indicating ring (FIGS. 8 and 9) correspond to each other in a fixed relationship. Each face of a planetary indicating ring can be fitted externally on the star atlas (FIGS. 3 and 4) by means of folding lobes 42. The planetary indicating rings and the star atlas are thus concentric. Time graduation 26 is marked along the circumference of the planetary indicating rings. The position of the sun is indicated by a solar symbol 28 at the position of noon time on the time graduation. Above the time graduation, there are indications of dates in the lunar calendar, symbols representing different phases of the moon 30, synodic 32, Mars 36 and Saturn 40, and the aberrations 29 of conjunctions in terms of the planetary periods of rotation. The positions of the numerals also indicates the numbers of days after the planetary conjunctions required to obtain the indicated phase angles.

Figure 10:
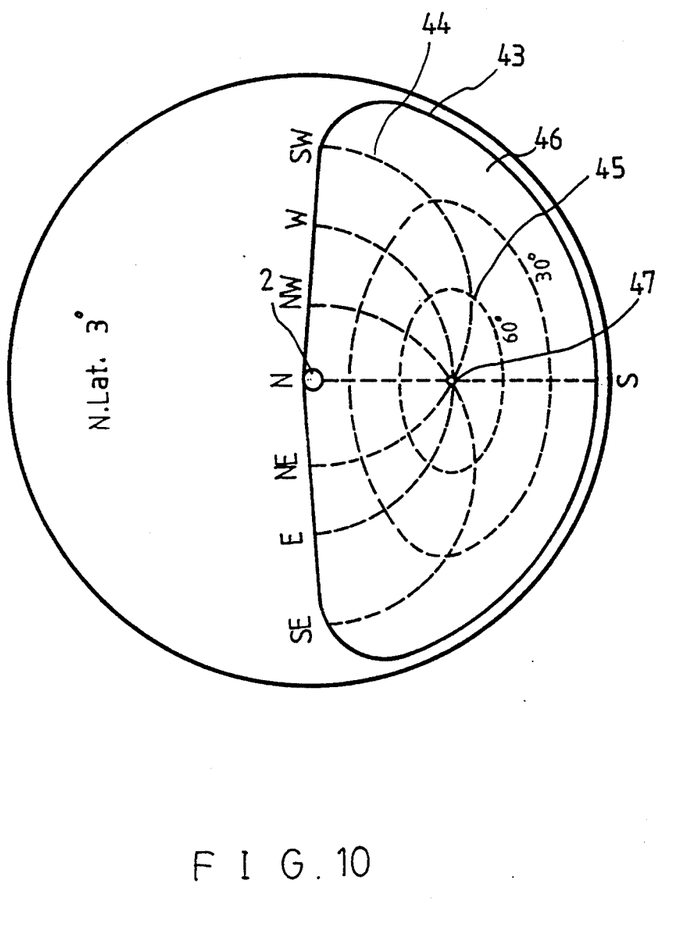
FIG. 10 shows the northern view of a fixed latitude observation chart.
Figure 11:
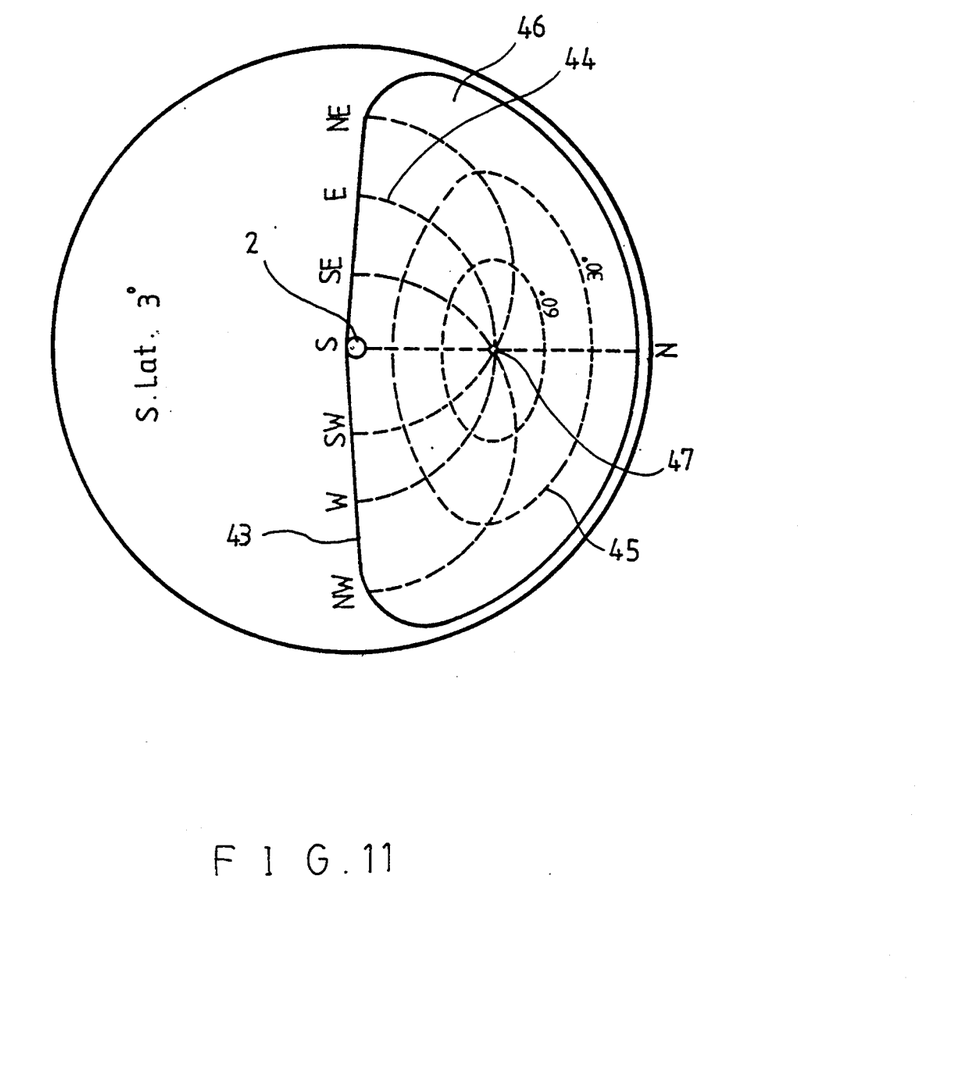
FIG. 11 shows the southern view of a fixed latitude observation chart.

The fixed latitude observation chart (FIGS. 10 and 11) is made of transparent plastic board. The northern and southern latitudinal lines are symmetrically joined and combined into a chart. A different chart is made for every 5 degrees latitude and thus there are more than different charts. These charts are divided into groups of about 15 or more charts in each group. Each chart can rotate about the polar hole 2 at its center and has an aperture 46 for observing stars. The aperture is manufactured with transparent plastic and is drawn by a circle of horizon 43 as observed from various longitudinal lines while the other region of the chart beyond the aperture is translucent. At the center of the aperture 46, i.e., the observer's celestial meridian, the zenith 47 is marked with the corresponding azimuth 44 and inclination 45 for determining the positions of celestial bodies. Each chart is interchangeable on the multipotent astrolabe for use in locations of different latitude.

Figure 12:
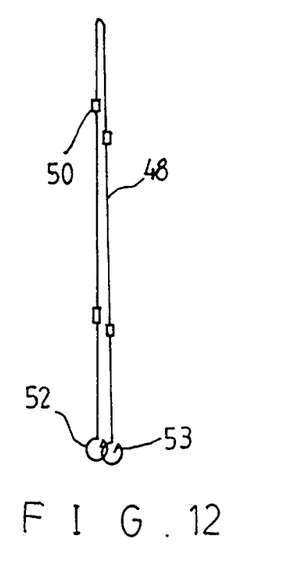
FIG. 12 shows a longitudinal retrograde wire and sliding indicator.
Figure 13:
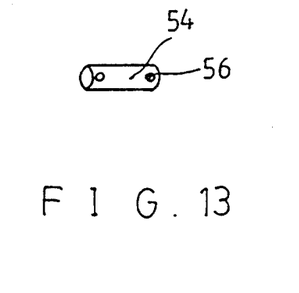
FIG. 13 shows a polar axis and its insert hole.

Referring to FIGS. 12 and 13, the polar axis 54 goes into the polar hole 2 for connecting the concentric charts. A longitudinal retrograde wire 48, made of spring wire, is bent into two sections. Each section has two sliding indicators 50. The end of each section is curved into a holding ring 52 and the tip is made into an insertion pin 53. The holding rings 52 are placed around the north and south polar axis 54 respectively, keeping the charts in position. The insertion pins 53 are respectively inserted into insert holes 56 of the north and south polar axis 54 for keeping the longitudinal retrograde wire 48 in position.

By rotating the longitudinal retrograde wire 48 and moving the sliding indicator 50 along the wire 48, a celestial body can be located in the chart. The two sliding indicators are used to avoid repeating the process for determining the position of a celestial body by placing one sliding indicator 50 on a determined value of phase angle and using the other sliding indicator 50 to determine the position of the celestial body. The orbits of the moon and planets in the solar system is very close to the ecliptic 8. From the position on the chart of the date of periodic conjunction of a certain planet or the moon, the phase angle to the sun can be determined. A sliding indicator 50 is thus placed on the value of this phase angle and the other sliding indicator 50 slides along the longitudinal retrograde wire 48, following the other section of the wire 48 to the other side of the astrolabe if necessary, to the position of the ecliptic, which is the position of the planet or the moon in the celestial sphere to be determined.

The operational steps of the multiple astrolabe are described as follows:

1. Selection of Latitude

From the terrestrial map (FIG. 6 or 7), first obtain the observer's latitude and then select the appropriate fixed latitude observation chart (FIG. 10 or 11) for the observer's latitude. For example, an observer in Miami, Fla., of latitude about 26 degrees North should select the fixed latitude observation chart for 25 degrees North. (If the chart already in place is for 25 degrees North, there is no need to change it.) To change charts, remove the insertion pin 53 and holding ring 52, replace the existing chart by the one selected for the observer's latitude, and put back the insertion pin 53 and holding ring 52. The holding rings and insertion pins can be easily undone and put chart. It is necessary to check that the northern latitude charts are used for the northern view of the multipotent astrolabe and southern latitude charts for the southern view.

2. Terrestrial Adjustment

Place the symbol of the zenith 47 of the center of the aperture 46 of the selected fixed latitude observation chart (FIG. 10 or 11) onto the terrestrial map (FIG. 6 or 7) at the position of the observer.

3. Adjustment of Date

Rotate the planetary ring (FIG. 8 or 9) to place the solar symbol 28 of the planetary ring onto the star atlas (FIG. 4 or 5) at the position of the date of observation.

4. Adjustment of Time

Rotate the fixed latitude observation chart (FIG. 10 or 11) together with the terrestrial map (FIG. 6 or 7) to place the northern or southern indications which are on the rim of the chart onto the planetary indicating ring (FIG. 8 or 9) at the position of the time of observation 26. If the longitude for a time zone at the observation spot is known, rotate the terrestrial map (FIG. 6 or 7) together with the fixed latitude observation chart (FIG. 10 or 11) and pinpoint the known longitude to the planetary indicating ring (FIG. 8 or 9) in order to indicate the time of observation thereon, the result will be greatly accurate.

5. Adjustment of Direction

This step is to match the directions on the multipotent astrolabe with the actual directions for the observer in the field. The adjust the directions, raise the multipotent astrolabe (FIG. 2 or 3) and look up through the fixed latitude observation chart (FIG. 10 or 11) to match the north and south direction of the chart correctly with the actual geographical north and south direction. (The actual geographical north and south direction can be found by a compass.)

After the above five steps are complete, all the sun, the moon, the planets, time, calendar and geography are in corresponding condition, more like that the sky, the earth, time and space are projected onto this little multipotent astrolabe.

To determine at this time the position of the star Vega (the alpha star of the constellation Lyra), first find this star in the star atlas (FIG. 4 or 5) and place a sliding indicator 50 of the longitudinal retrograde wire 48 onto the position of this star in the atlas. The position of this star in the sky, if shown inside the aperture 46 of the fixed latitude observation chart, can be determined by the azimuth 44 and inclination 45 on the chart.

To determine at this time the position of the moon, first look up the date in the lunar calendar for today and place a sliding indicator 50 of the longitudinal retrograde wire 48 onto the lunar date phase of the moon; then move another sliding indicator 50 via the longitudinal retrograde wire 48 following the other section of the wire 48 to the other side of the astrolabe if necessary, to the position of the ecliptic, which is the position of the moon in the celestial sphere to be determined.

Figure 8:
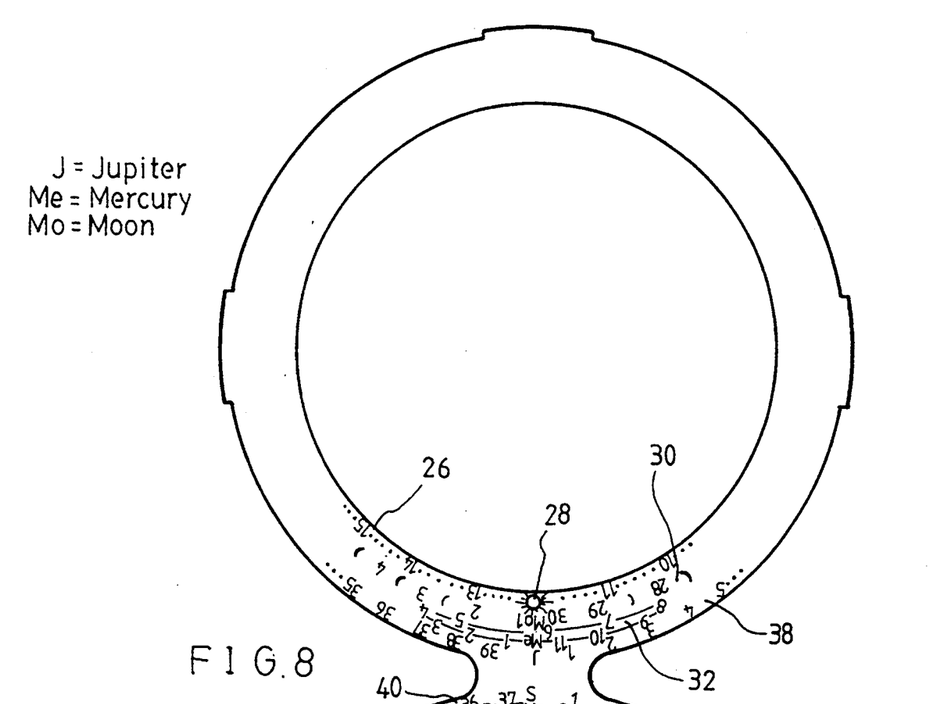
FIG. 8 shows the northern face of a planetary indicating ring.
Figure 9:
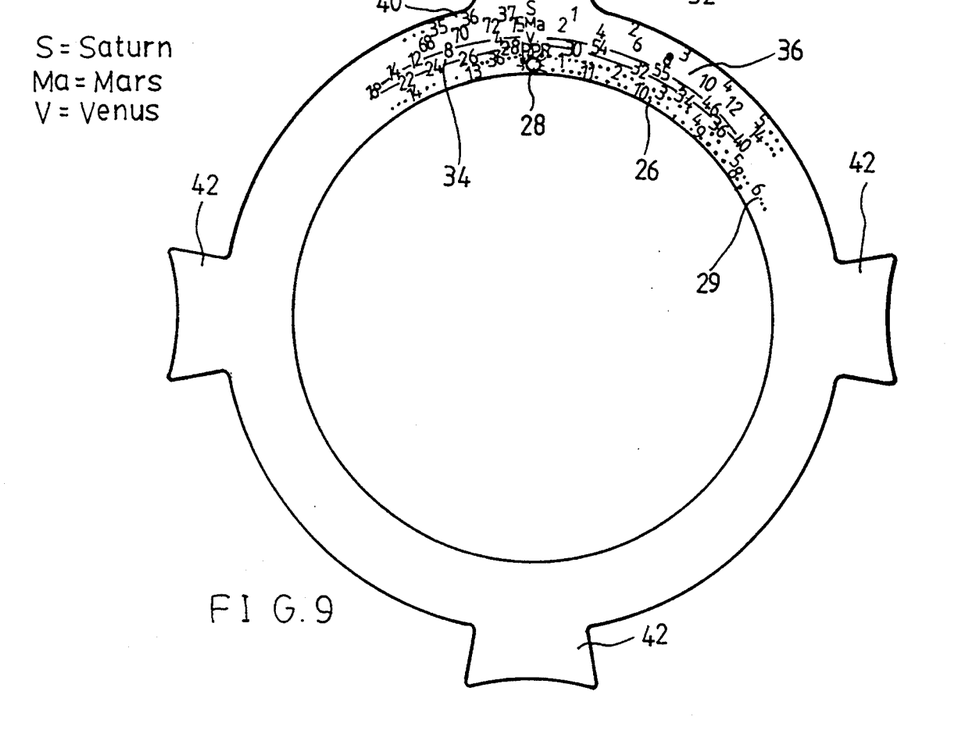
FIG. 9 shows the southern face of a planetary indicating ring.

To determine at this time the position of Jupiter, first find out the latest date of its conjunction (from one of the reference tables supplied with the manual) and determine the aberrations 29 of conjunction on the planetary indicating ring (FIG. 8 or 9) by tracing the longitudinal line from the solar calendar date of the star atlas. If the aberrations are longer than one year, 36.5 periods of 10 days each must be added to the number on the planetary indicating ring (FIG. 8 or 9). Find the same number on the synodic period 38 for Jupiter and move a sliding indicator 50 to this position. Then, move another sliding indicator 50 via the longitudinal retrograde wire 48, following the other section of the wire 48 to the other side of the astrolabe if necessary, to the position of the ecliptic 8, which is the position of Jupiter at that time.

Similarly, the positions of Mars, Venus, Mercury and Saturn can be determined by this process. As to Uranus 14, Neptune 16 and Pluto 18, their orbital positions have for the past several years moved within the star atlas (FIG. 4 or 5) and can be obtained directly.

To determine at this time the local time in New York City, first find the position of New York City in the terrestrial map and look up its longitude in its time zone which is 75 degrees west; then, following this line to the time graduation 26 of the planetary indicating ring (FIG. 8) which is the local time of New York City at this time.

There are many other applications with the multipotent astrolabe such as determining in the past or future the position of the sun, moon or star from any place on Earth, the time of rise and set of celestial bodies, and the time of high and low tide from the positions of the sun and the moon.

Although planarized indications of inclination and azimuth may not be as satisfactory as those in a apherical instrument and the positions of the moon and planets may be slightly imprecise owing to eccentricity and orbital inclination, the multipotent astrolabe is ideally precise for ordinary use.

Various modification may be lade by those skilled in the arts without departing from the essence of the invention as defined in the appended claims and their legal equivalents.

I claim:

1. A multipotent astrolabe for concentrically and symmetrically presenting northern and southern celestial views comprising:

a pair of planetary indicating rings concentrically and rotatably surrounding the outside of a star atlas, a pair of terrestrial maps and a pair of fixed latitude observation charts, said pair of planetary indicating rings being divided into a northern face and a southern face, said each face being fitted on a rim of said star atlas by means of holding lobes;

said northern and southern faces of said planetary indicating ring having marks of time graduation, solar symbol, dates of lunar calendar, different faces of Moon, synodic periods and sidereal periods of Venus, Jupiter, Mercury, Mars and Saturn, aberrations of conjunctions in terms of planetary periods of rotation and numbers of Ten days after planetary conjunctions for working out indicated phase angles between said solar and planets;

a longitudinal retrograde wire of two sections having a curved holding ring at one end thereof being placed around a north polar axis and a south polar axis and a tip of insertion pin at the other end thereof being releasably inserted into retaining holes of said north and south polar axes, thus said longitudinal retrograde wire keeping in position of said star atlas, said terrestrial maps, said fixed latitude observation charts and said planetary indicating rings and swinging on said north and south polar axes;

whereby said planetary indicating rings in cooperation with said longitudinal retrograde wire can precisely determine the positions of indicated celestial bodies on said multipotent astrolabe.

2. A multipotent astrolabe according to claim 1, wherein said longitudinal retrograde wire made of spring wire.

3. A multipotent astrolabe according to claim 1, wherein said holding ring and said tip of insertion pin of said longitudinal retrograde wire are easily undone and put back in position for changing said fixed latitude observation charts.

4. A multipotent astrolabe according to claim 1, further has a pair of sliding indicators slidingly disposed to each section of said longitudinal retrograde wire thereon.

* * * * *